(12) United States Patent
Wang et al.

(10) Patent No.: US 12,710,382 B2
(45) Date of Patent: Aug. 18, 2026

(54) RADIATION INSPECTION SYSTEM

(71) Applicant: NUCTECH COMPANY LIMITED, Beijing (CN)

(72) Inventors: Qiangqiang Wang, Beijing (CN); Junping Shi, Beijing (CN); Yuan He, Beijing (CN); Hongqi Li, Beijing (CN); Hui Meng, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 163 days.

(21) Appl. No.: 18/716,144

(22) PCT Filed: Dec. 28, 2022

(86) PCT No.: PCT/CN2022/142633
§ 371 (c)(1),
(2) Date: Jun. 4, 2024

(87) PCT Pub. No.: WO2023/125612
PCT Pub. Date: Jul. 6, 2023

(65) Prior Publication Data

US 2025/0035568 A1 Jan. 30, 2025

(30) Foreign Application Priority Data

Dec. 30, 2021 (CN) ......................... 202111661865.9

(51) Int. Cl.
*G01N 23/046* (2018.01)
*G01N 23/06* (2018.01)

(52) U.S. Cl.
CPC .......... *G01N 23/046* (2013.01); *G01N 23/06* (2013.01); *G01N 2223/643* (2013.01)

(58) Field of Classification Search
CPC ................ G01N 23/046; G01N 23/06; G01N 2223/643; G01N 2223/419; G01N 23/04; G01V 5/226; Y02E 30/30
See application file for complete search history.

(56) References Cited

U.S. PATENT DOCUMENTS 5,638,420 A 6/1997 Armistead
6,171,182 B1 * 1/2001 Geib ........................ G07D 3/14 453/10

(Continued)

FOREIGN PATENT DOCUMENTS

CN 2419218 Y 2/2001
CN 2537859 Y 2/2003

(Continued)

OTHER PUBLICATIONS

Translation of WO2014015490 (Year: 2014).*

(Continued)

*Primary Examiner* — Uzma Alam
*Assistant Examiner* — Mamadou Faye
(74) *Attorney, Agent, or Firm* — Kilpatrick Townsend & Stockton LLP

(57) ABSTRACT

A radiation inspection system including: a radiation imaging device, which includes at least one radiation source and at least one detector module, has a CT inspection mode and a DR inspection mode, and is configured to perform radiation inspection on an object to be inspected passing through an inspection channel; a conveying device, which includes a conveying device main body, and a primary-secondary motor in drive connection with the conveying device main body, including a main motor, a sub-motor, and a speed reducer; and a controller in signal connection with the radiation imaging device and the primary-secondary motor, configured such that when the radiation imaging device is in the CT inspection mode, the conveying device main body is (Continued)

in drive connection with the sub-motor, and in the DR inspection mode, the conveying device main body is in drive connection with the main motor.

7 Claims, 4 Drawing Sheets

(56) References Cited

U.S. PATENT DOCUMENTS

| | | | | |
|---|---|---|---|---|
| 6,553,094 | B1 * | 4/2003 | Bernardi | G01N 23/046 378/57 |
| 7,343,660 | B1 * | 3/2008 | Lemelson | B23Q 41/06 901/6 |
| 2005/0006586 | A1 | 1/2005 | Balan et al. | |
| 2006/0093083 | A1 | 5/2006 | Nishide et al. | |
| 2013/0079631 | A1 | 3/2013 | Horiike et al. | |
| 2017/0090062 | A1 | 3/2017 | Cao et al. | |
| 2018/0189944 | A1 * | 7/2018 | Kirschenman | G01N 23/223 |
| 2019/0127167 | A1 | 5/2019 | Mori | |
| 2020/0253576 | A1 | 8/2020 | Urchuk | |

FOREIGN PATENT DOCUMENTS

| | | | | |
|---|---|---|---|---|
| CN | 1916611 | A | 2/2007 | |
| CN | 201044406 | Y | 4/2008 | |
| CN | 201637698 | U | 11/2010 | |
| CN | 101936924 | A | 1/2011 | |
| CN | 103640469 | A | 3/2014 | |
| CN | 104773465 | A | 7/2015 | |
| CN | 105125232 | A | 12/2015 | |
| CN | 205141950 | U | 4/2016 | |
| CN | 106667510 | A | 5/2017 | |
| CN | 108254397 | A | 7/2018 | |
| CN | 108542413 | A | 9/2018 | |
| CN | 109932374 | A | 6/2019 | |
| CN | 110460266 | A | 11/2019 | |
| CN | 209705217 | U | 11/2019 | |
| CN | 211329855 | U | 8/2020 | |
| CN | 211627844 | U | 10/2020 | |
| CN | 113659890 | A | 11/2021 | |
| GB | 1029708 | A | 5/1966 | |
| KR | 20000018941 | U | 10/2000 | |
| WO | WO-2014015490 | A1 * | 1/2014 | G01N 23/04 |

OTHER PUBLICATIONS

ISR received in PCT/CN2022/142633; mailed Mar. 2, 2023.

Written Opinion of ISR received in PCT/CN2022/142633; mailed Mar. 2, 2023.

The First Office Action issued in Chinese corresponding application No. 202111661865.9 mailed on Jul. 19, 2025, 18 pages.

* cited by examiner

RADIATION INSPECTION SYSTEM

CROSS-REFERENCE TO RELATED APPLICATIONS

The present disclosure is a national phase application of International Application No. PCT/CN2022/142633, filed on Dec. 28, 2022, which claims priority to Chinese Patent Application No. 202111661865.9, filed on Dec. 30, 2021, the disclosure of which is hereby incorporated by reference in its entirety.

FIELD

The present disclosure relates to the field of radiation inspection technology, in particular to a radiation inspection system.

BACKGROUND

Imaging technologies for radiation inspection systems for inspection of objects to be inspected include DR (Digital Radiography) inspection technology and CT (Computed Tomography) inspection technology. The objects to be inspected include, for example, vehicles, containers, luggage, etc.

The DR inspection technology uses two-dimensional digital imaging technology in which a radiation source and a detector module are fixed. It has the advantages that the inspection speed is fast, the pass rate of objects to be inspected is high, and metal and other dangerous goods are easy to determine; and it has the disadvantages that the amount of information on an object to be inspected obtained by the detector module is small, and explosives are difficult to determine accurately, and it is more suitable for forming planar images.

The CT inspection technology mainly utilizes a CT reconstruction algorithm to reconstruct a tomographic image of an object to be inspected. It has the advantages that the amount of tomographic data information is large, and explosives can be determined accurately by reconstruction of tomographic images; and it has the disadvantages that the inspection speed is slow, and the pass rate of objects to be inspected is low.

Due to the shortcomings of both the above two types of inspection technologies, which makes it difficult to meet the requirements of both a high pass rate and high accuracy, radiation inspection systems with multiple scanning modes have been proposed in the related art, which use the DR inspection technology and the CT inspection technology in combination to perform scanning inspection on objects to be inspected.

In the case of a radiation inspection system that uses the DR inspection technology and the CT inspection technology in combination, a scanning speed when an object to be inspected is inspected by using the DR inspection technology is higher than a scanning speed when the object to be inspected is inspected by using the CT inspection technology. In order to accomplish continuous scanning, a conveying device that conveys the object to be inspected needs to have the ability to convey the object to be inspected smoothly in a wide range of speeds. For example, in a radiation inspection system for inspecting large objects to be inspected (e.g., vehicles to be inspected), a self-travelling conveying device is often used to tow a vehicle to be inspected, and the conveying device needs to have the ability to tow the vehicle to be inspected smoothly in a wide range of speeds. In scanning inspection of the vehicle to be inspected, the vehicle to be inspected passes through a scanning area of an inspection channel under the traction of the conveying device, to scan and imaging goods, such as containers, on the vehicle to be inspected to perform radiation inspection on the goods on the vehicle to be inspected.

In the related art, a conveying device of a radiation inspection system using the DR inspection technology is generally driven by a variable frequency motor. To simultaneously adapt to a conveying speed required for the CT inspection technology, the variable frequency motor needs to work at a very low frequency, such as working at a frequency lower than 8 Hz, and in this case, the variable frequency motor produces waveform distortion, and the motor generates heat, resulting in softened mechanical characteristics and a reduced torque, and it is difficult to meet the requirement of low-speed heavy-load smooth operation. Therefore, in the related art, in a radiation inspection system that uses the DR inspection technology and the CT inspection technology in combination, in order to adapt to the requirement of smoothly conveying objects to be inspected in a wide range of speeds, multiple servo motors are used, and each servo motor drives different driving wheels to implement adjustment of a conveying speed of a conveying device in such a manner that different servo motors are used to drive different driving wheels during inspection by the DR inspection technology and during inspection by the CT inspection technology. After a motor is replaced with a new one in the presence of motor damage, when the new motor is powered on, a servo driver performs automatic identification of servo motor parameters. If the same servo driver drives two servo motors, the servo driver will identify incorrect servo motor parameters, and the servo motor cannot be well controlled, and alarming even occurs in the process of operation. Therefore, generally it needs to configure one servo motor correspondingly for one servo driver, leading to a high cost and great difficulty of control.

SUMMARY

An object of the present disclosure is to provide a radiation inspection system intended to simplify the control of its conveying device and save costs.

The present disclosure provides a radiation inspection system, including:

- a radiation imaging device, which includes at least one radiation source and at least one detector module, has a CT inspection mode and a DR inspection mode, and is configured to perform radiation inspection on an object to be inspected passing through an inspection channel;
- a conveying device, which includes a conveying device main body, and a primary-secondary motor in drive connection with the conveying device main body to drive the conveying device main body to move along the inspection channel, the primary-secondary motor including a main motor, a sub-motor, and a speed reducer; and
- a controller in signal connection with the radiation imaging device and the primary-secondary motor, the controller being configured and when the radiation imaging device is in the CT inspection mode, the conveying device main body is in drive connection with the sub-motor through the speed reducer to convey the object to be inspected under the drive of the sub-motor, and in the DR inspection mode, the conveying device main body is in drive connection with the main motor to convey the object to be inspected under the drive of the main motor, and a conveying speed when the conveying device main body is in drive connection with the main motor is higher than a conveying speed when the conveying device main body is in drive connection with the sub-motor.

In the radiation inspection system of some embodiments, the controller is configured to receive a working mode signal of the radiation imaging device and generate a control command according to the working mode signal, the working mode signal indicating the radiation imaging device is in the CT inspection mode or the DR inspection mode; and the conveying device further includes a frequency converter and a switching device, and the frequency converter is configured to be in signal connection with the controller, to receive the control command and adjust an output parameter according to the control command, and the switching device is electrically connected to the frequency converter and is configured to selectively electrically connect the frequency converter to one of the main motor and the sub-motor.

In the radiation inspection system of some embodiments, the radiation inspection system further includes a mode detecting device, and the mode detecting device is in signal connection with the radiation imaging device and the controller, and the mode detecting device is configured to monitor working parameters of the radiation imaging device and transmit the working parameters as a working mode signal to the controller.

In the radiation inspection system of some embodiments, the radiation imaging device includes:

a CT imaging part, which includes a first radiation source and a first detector module disposed corresponding to the first radiation source; and a DR imaging part, which includes a second radiation source and a second detector module disposed corresponding to the second radiation source.

In the radiation inspection system of some embodiments, the radiation imaging device includes one radiation source and one detector module corresponding to the radiation source, and the radiation source and the detector module switch between the DR inspection mode and the CT inspection mode.

In the radiation inspection system of some embodiments, the conveying device includes a self-travelling conveying device, and the self-travelling conveying device includes a driving wheel connected to the conveying device main body, and the primary-secondary motor is in drive connection with the driving wheel.

In the radiation inspection system of some embodiments, the radiation inspection system further includes a track, and the driving wheel is located on the track; and the conveying device further includes a limiting wheel, which cooperates with a lateral side of the track.

In the radiation inspection system of some embodiments, the primary-secondary motor further includes a first connecting part and a second connecting part, and the first connecting part and the second connecting part each include two transmission parts having an axially connected state and an axially separated state, respectively; the speed reducer has an input shaft and an output shaft; the main motor is connected to the output shaft via the first connecting part; the sub-motor is connected to the input shaft via the second connecting part; and the primary-secondary motor is in drive connection with the conveying device main body by means of the main motor.

Based on the radiation inspection system provided in embodiments of the present disclosure, the DR inspection technology and the CT inspection technology are used in combination, and the primary-secondary motor is in drive connection with the conveying device main body, and the primary-secondary motor combines the main motor and the sub-motor into a whole through the speed reducer, and the primary-secondary motor has a large speed difference between a speed when the main motor is used for driving and a speed when the sub-motor is used for driving in the process of conveyance and positioning of the conveying device. The main motor and the sub-motor of the primary-secondary motor can be respectively matched with the DR inspection mode and the CT inspection mode of the radiation inspection system, and good matching between a scanning speed and a conveying speed can be achieved directly by a matching relationship between the main motor and the sub-motor of the primary-secondary motor and the DR inspection mode and the CT inspection mode, so the control of the conveying device can be simplified and the cost can be saved.

Other features and advantages of the present disclosure will become apparent from the following detailed description of exemplary embodiments of the present disclosure with reference to the accompanying drawings.

BRIEF DESCRIPTION OF THE DRAWINGS

Drawings illustrated herein are used for providing further understanding of the present disclosure and form part of the present application, and illustrative embodiments of the present disclosure and description thereof are intended for explaining instead of improperly limiting the present disclosure. In the drawings.

DETAILED DESCRIPTION OF THE DISCLOSURE

Figure 1:
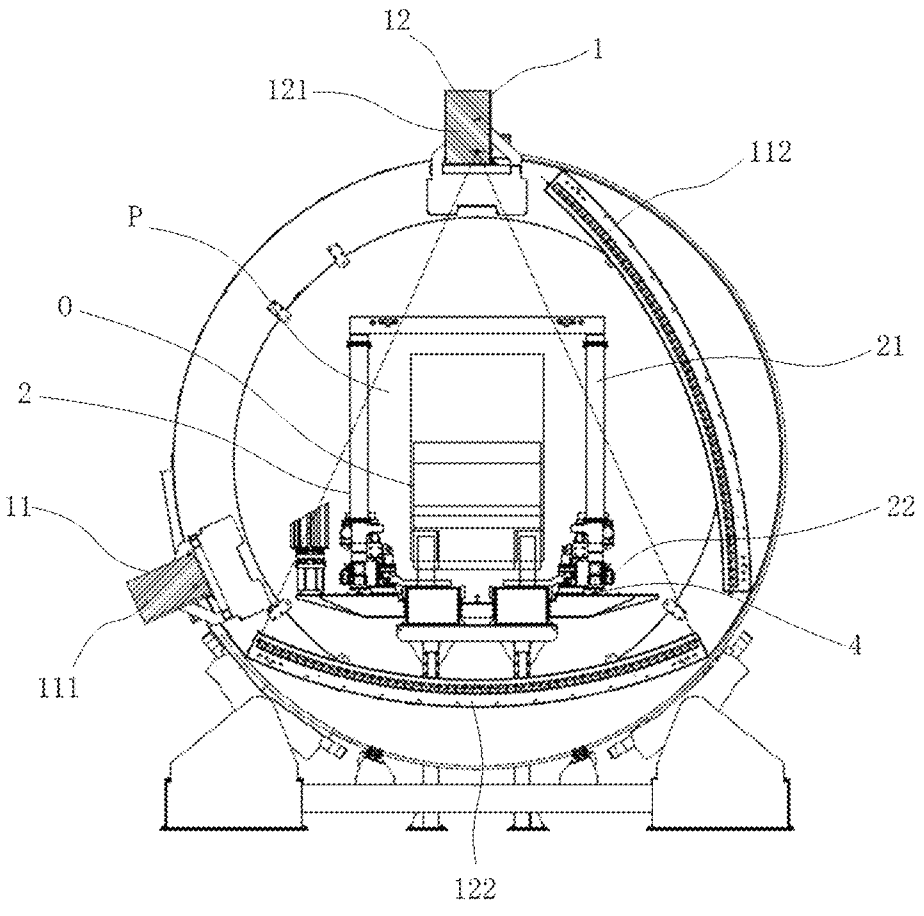
FIG. 1 is a structure diagram of a radiation inspection system in embodiments of the present disclosure.

The embodiments of the present disclosure will be described below clearly and completely in conjunction with the accompanying drawings in the embodiments of the present disclosure. The described embodiments are only part of, instead of all of the embodiments of the present disclosure. The following description of at least one exemplary embodiment is actually only illustrative, and in no way serves as any limitation on the present disclosure and its application or use.

Unless specifically stated otherwise, the relative arrangement of components and steps, numerical expressions and numerical values set forth in these embodiments do not limit the scope of the present disclosure. Furthermore, it should be appreciated that, for ease of description, the sizes of various parts shown in the drawings are not drawn in accordance with actual proportional relationships. In all examples shown and discussed here, any specific value should be interpreted as merely exemplary, rather than as a limitation. Therefore, other examples of an exemplary embodiment may have different values. It should be noted that similar reference numerals and letters denote similar items in the following drawings, so once a certain item is defined in one drawing, it does not need to be further discussed in subsequent drawings.

In the description of the present disclosure, it should be understood that the use of terms such as "first" and "second" to define parts and components is only for the convenience of distinguishing the corresponding parts and components. Unless otherwise stated, the above terms have no special meanings, and therefore cannot be construed as limitations on the protection scope of the present disclosure.

In description of the present disclosure, it should be understood that orientation or position relations denoted by terms such as "front", "rear", "upper", "lower", "left", "right", "transverse", "longitudinal", "vertical", "horizontal", "top" and "bottom" are generally orientation or position relations illustrated based on the drawings, and are merely for the convenience of describing the present disclosure and simplifying description, and unless stated to the contrary, such terms do not indicate or imply the denoted devices or elements must have specific orientations or be constructed and operated in specific orientations, and thus cannot be construed as limiting the protection scope of the present disclosure; and orientation terms "inner" and "outer" refer to the inside and outside with respect to the contour of each component itself.

As shown in FIGS. 1 to 6, embodiments of the present disclosure provide a radiation inspection system. The radiation inspection system mainly includes a radiation imaging device 1, a conveying device 2 and a controller 3.

The radiation imaging device 1 includes at least one radiation source and at least one detector module, has a CT inspection mode and a DR inspection mode, and is configured to perform radiation inspection on an object to be inspected O passing through an inspection channel P.

The conveying device 2 includes a conveying device main body 21, and a primary-secondary motor 22 in drive connection with the conveying device main body 21 to drive the conveying device main body 21 to move along the inspection channel P. The primary-secondary motor 22 includes a main motor 221, a sub-motor 223, and a speed reducer 225. The conveying device 2 may be, for example, a self-travelling conveying device, a plate chain conveying device, a belt conveying device, or the like.

The controller 3 is in signal connection with the radiation imaging device 1 and the primary-secondary motor 22, and the controller 3 is configured and when the radiation imaging device 1 is in the CT inspection mode, the conveying device main body 21 is in drive connection with the sub-motor 223 through the speed reducer 225 to convey the object to be inspected O under the drive of the sub-motor 223, and in the DR inspection mode, the conveying device main body 21 is in drive connection with the main motor 221 to convey the object to be inspected O under the drive of the main motor 221, and a conveying speed when the conveying device main body 21 is in drive connection with the main motor 221 is higher than a conveying speed when the conveying device main body is in drive connection with the sub-motor 223.

The controller 3 may be embodied as a general-purpose processor, a programmable logic controller (PLC), a digital signal processor (DSP), an application specific integrated circuit (ASIC), a field-programmable gate array (FPGA) or other programmable logic device, a discrete gate or transistor logic device, a discrete hardware component, or any appropriate combination thereof, for performing functions described in the present disclosure.

According to the radiation inspection system in embodiments of the present disclosure, the DR inspection technology and the CT inspection technology are used in combination, and the primary-secondary motor 22 is in drive connection with the conveying device main body 21, and the primary-secondary motor 22 combines the main motor 221 and the sub-motor 223 into a whole through the speed reducer 225, and the primary-secondary motor 22 has a large speed difference between a speed when the main motor 221 is used for driving and a speed when the sub-motor 223 is used for driving in the process of conveyance and positioning of the conveying device 2. The main motor 221 and the sub-motor 223 of the primary-secondary motor 22 can be respectively matched with the DR inspection mode and the CT inspection mode of the radiation inspection system, and good matching between a scanning speed and a conveying speed can be achieved directly by a matching relationship between the main motor 221 and the sub-motor 223 of the primary-secondary motor 22 and the DR inspection mode and the CT inspection mode, so the control of the conveying device can be simplified and the cost can be saved.

Embodiments of the present disclosure are further described below in conjunction with FIGS. 1 to 6.

As shown in FIGS. 1 to 6, embodiments of the present disclosure are described by using a large radiation inspection system for radiation inspection of objects to be inspected O, such as vehicles, containers, and the like, commonly used in sectors such as customs and railroad systems. In the following description, an object to be inspected O is specifically a vehicle to be inspected.

As shown in FIGS. 1 to 6, embodiments of the present disclosure provide a radiation inspection system. The radiation inspection system includes a radiation imaging device 1, a conveying device 2, a controller 3, a track 4, and a mode detecting device 5.

The radiation imaging device 1 has the CT inspection mode and the DR inspection mode, and is configured to perform radiation inspection on an object to be inspected O passing through an inspection channel P. During radiation inspection of a vehicle to be inspected, the vehicle to be inspected passes through a scanning area in the inspection channel P under the traction of the conveying device 2, to scan and imaging goods, such as containers, on the vehicle to be inspected to perform radiation inspection on the goods on the vehicle to be inspected. A scanning speed when the radiation inspection system in the DR inspection mode as compared with the CT inspection mode is much higher than a scanning speed when the radiation inspection system is in the CT inspection mode. To accomplish continuous scanning, the conveying device 2 has an ability to tow the vehicle to be inspected smoothly in a wide range of speeds. In the present embodiments, the ratio of the highest conveying speed to the lowest conveying speed of the conveying device 2 is about 50.

In embodiments of the present disclosure, as shown in FIG. 1, the radiation imaging device 1 includes a CT imaging part 11 and a DR imaging part 12. The CT imaging part 11 includes a first radiation source 111 and a first detector module 112 disposed corresponding to the first radiation source 111. The DR imaging part 12 includes a second radiation source 121 and a second detector module 122 disposed corresponding to the second radiation source 121. That is, at least one radiation source includes a first radiation source 111 and a second radiation source 121, and at least one detector module includes a first detector module 112 and a second detector module 122. The CT imaging part may, for example, be configured as a CT imaging part with a single energy output or multiple energy outputs.

In embodiments not illustrated, the radiation imaging device 1 may include one radiation source and one detector module corresponding to the radiation source. The radiation source and the detector module switch between the DR inspection mode and the CT inspection mode. That is, the radiation imaging device 1 only includes one imaging part, which can switch between the DR inspection mode and the CT inspection mode. In the CT inspection mode, the radiation source and the detector module of the imaging part rotate, and the conveying device 2 conveys the object to be inspected O at a slow speed. In the DR imaging mode, the radiation source and the detector module of the imaging part are motionless, and the conveying device 2 conveys the object to be inspected O at a fast speed.

Besides, the radiation imaging device 1 may also include three or more imaging parts. For example, in the case where the CT imaging part and the DR imaging part are provided respectively, it is not excluded that two independent DR imaging parts may be provided to inspect the object to be inspected O from different view angles.

The use of the DR inspection mode and the CT inspection mode may be switched according to radiation inspection needs. For example, for each vehicle to be inspected, scanning inspection can be first performed in the DR inspection mode to obtain a scanning image, then whether there is suspected prohibited goods is determined based on the scanning image, and if there is suspected prohibited goods, it also needs to determine the location of the suspected prohibited goods in the vehicle to be inspected. For a vehicle to be inspected that does not have suspected prohibited goods, it can be released directly after scanning inspection is completed. For a scanned vehicle with suspected prohibited goods, the location in the vehicle to be inspected where the suspected prohibited goods are located is subjected to scanning inspection in the CT inspection mode to make more accurate determination. This is conducive to ensuring both inspection efficiency and accuracy degree for the DR inspection mode and the CT inspection mode.

As shown in FIGS. 1 to 6, the conveying device 2 includes a conveying device main body 21, a primary-secondary motor 22, a driving wheel 23, a limiting wheel 24, a frequency converter 25, and a switching device 26.

The primary-secondary motor 22 is in drive connection with the conveying device main body 21 to drive the conveying device main body 21 to move along the inspection channel P. The primary-secondary motor 22 includes a main motor 221, a first connecting part 222, a sub-motor 223, a second connecting part 224, and a speed reducer 225.

The first connecting part 222 and the second connecting part 224 each include two transmission parts having an axially connected state and an axially separated state, respectively. In the present embodiments, the first connecting device 222 may, for example, be a clutch. For the clutch, the two transmission parts are two components of the clutch that clutch each other. The second connecting part 224 may, for example, be a coupling. For the coupling, the two transmission parts are two shaft connecting parts of the coupling.

Figure 2:
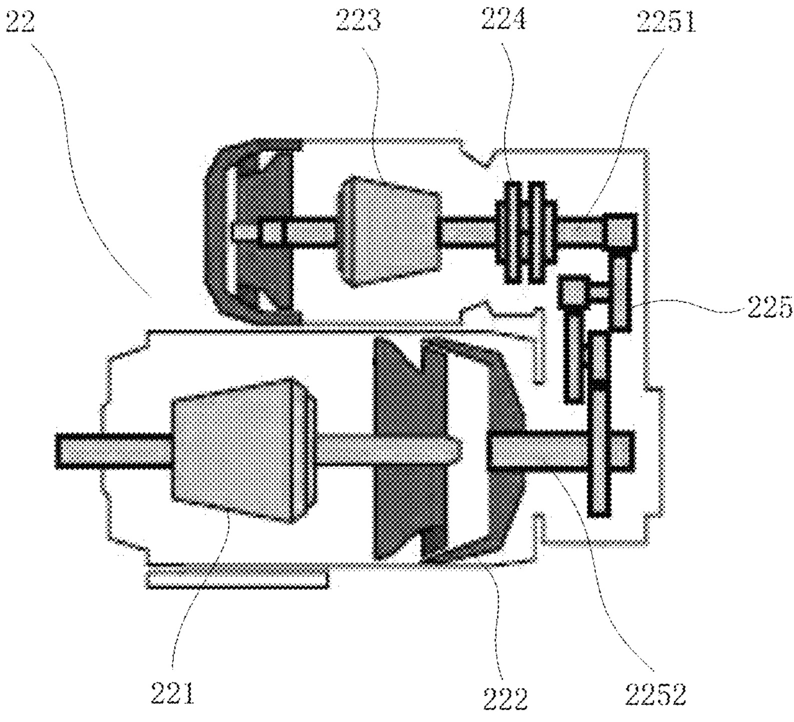
FIGS. 2 to 4 are working principle diagrams of a primary-secondary motor.
Figure 3:
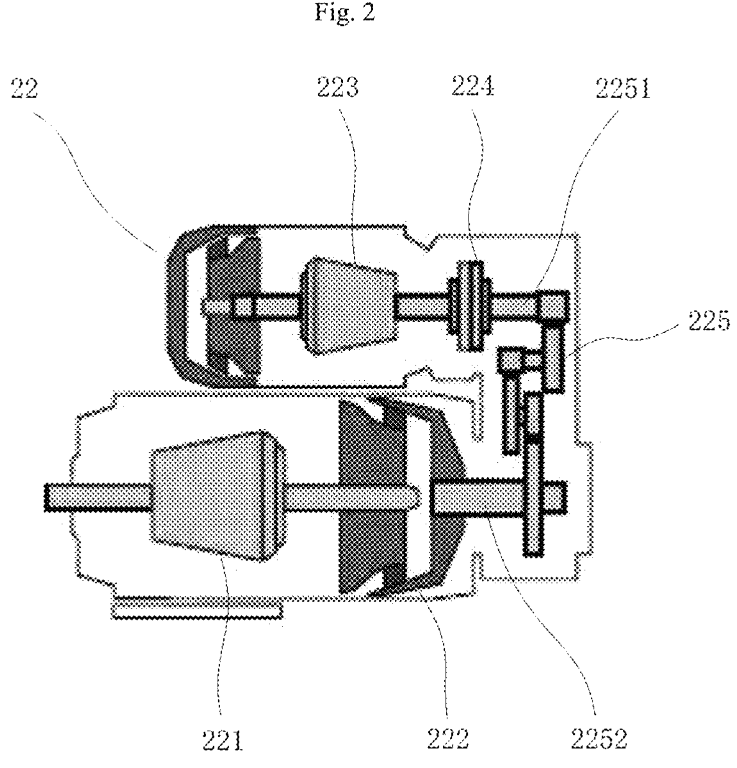
Figure 4:
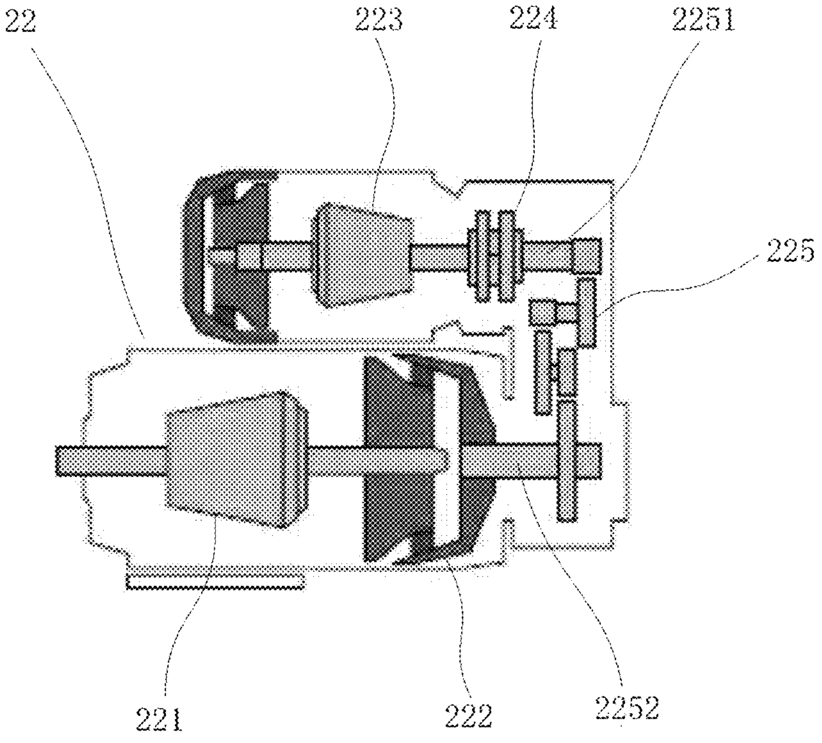

As shown in FIGS. 2 to 4, the speed reducer 225 has an input shaft 2251 and an output shaft 2252. The main motor 221 is connected to the output shaft 2252 via the first connecting part 222. The sub-motor 223 is connected to the input shaft 2251 via the second connecting part 224. The primary-secondary motor 22 is in drive connection with the conveying device main body 21 by means of the main motor 221.

In embodiments not illustrated, the first connecting part 222 may be in a form other than a clutch, such as a coupling, and the second connecting part 224 may be in a form other than a coupling, such as a clutch.

As shown in FIG. 2 to 4, the primary-secondary motor 22 is a composite motor combining the higher-power main motor 221 with the lower-power sub-motor 223 by the speed reducer 225 to obtain an ultra-wide speed ratio.

As shown in FIG. 2, when the main motor 221 is powered on and works, the sub-motor 223 is not power on and is in a braking state, the two transmission parts of the first connecting part 222 are in the axially separated state, the two transmission parts of the second connecting part 224 are also in the axially separated state, and the speed reducer 225 does not work, and at that time, a main shaft of the main motor 221 outputs a high speed. The primary-secondary motor in a working state shown in FIG. 2 corresponds to the DR scanning mode.

As shown in FIG. 3, when the sub-motor 223 is powered on and works, the main motor 221 is not powered on, the two transmission parts of the first connecting part 222 are in the axially connected state, the two transmission parts of the second connecting part 224 are also in the axially connected state, the sub-motor 223 causes, through the speed reducer 225, the main motor 221 to rotate, the primary-secondary motor 22 relies on the sub-motor 223 for driving, and after the power of the sub-motor 223 is transmitted to a rotating shaft of the main motor 221 through the speed reducer 225, the rotating shaft of the main motor 221 outputs a low and smooth rotating speed. The primary-secondary motor in the working state shown in FIG. 3 corresponds to the CT scanning mode.

As shown in FIG. 4, the sub-motor 223 is in the braking state, the main motor 221 is in the braking state, the two transmission parts of the first connecting part 222 are in the axially connected state, the two transmission parts of the second connecting part 224 are in the axially separated state, and both the main motor 221 and the sub-motor 223 are inactive.

The controller 3 is in signal connection with the radiation imaging device 1 and the primary-secondary motor 22, and the controller 3 is configured and when the radiation imaging device 1 is in the CT inspection mode, the conveying device main body 21 is in drive connection with the sub-motor 223 through the speed reducer 225, and no power is output from the main motor 221 to the conveying device main body 21; and in the DR inspection mode, the conveying device main body 21 is in drive connection with the main motor 221, and no power is output from the sub-motor 223 to the conveying device main body 21.

According to the above description, it can be seen that in embodiments of the present disclosure, by switching the states of the main motor 221 and the sub-motor 223 in the primary-secondary motor 22, the primary-secondary motor 22 can obtain an ultra-wide speed ratio, and achieve precise positioning, and a constant speed during low-speed operation, and is not liable to be affected by the load. After the primary-secondary motor 22 is drive connected to the conveying device main body 21, the main motor 221 and the sub-motor 223 of the primary-secondary motor 22 can be respectively matched with the DR inspection mode and the CT inspection mode of the radiation inspection system that adopts the DR inspection technology and the CT inspection technology in combination, and good matching between a scanning speed and a conveying speed can be achieved directly by a matching relationship between the main motor 221 and the sub-motor 223 of the primary-secondary motor 22 and the DR inspection mode and the CT inspection mode, so the control of the conveying device can be simplified and the cost can be saved.

The use of the primary-secondary motor 22 in the radiation inspection system as a power source for driving the conveying device 2 achieves high positioning precision, and allows a high load weight, and frequent startup per unit of time. In one embodiment, the primary-secondary motor 22 has good performance such as anti-vibration and high temperature resistance. Since the main motor 221 uses a clutch for braking, the primary-secondary motor 22 and transmission components can be protected from damage if the conveying path is uneven during a traveling process, such as when it needs to cross a gap of the track 4, during conveyance of the object to be inspected O by the conveying device 2, and thus the structure of the conveying device 2 is robust and durable, simple and easy to implement, and its environmental adaptability is strong.

Figure 6:
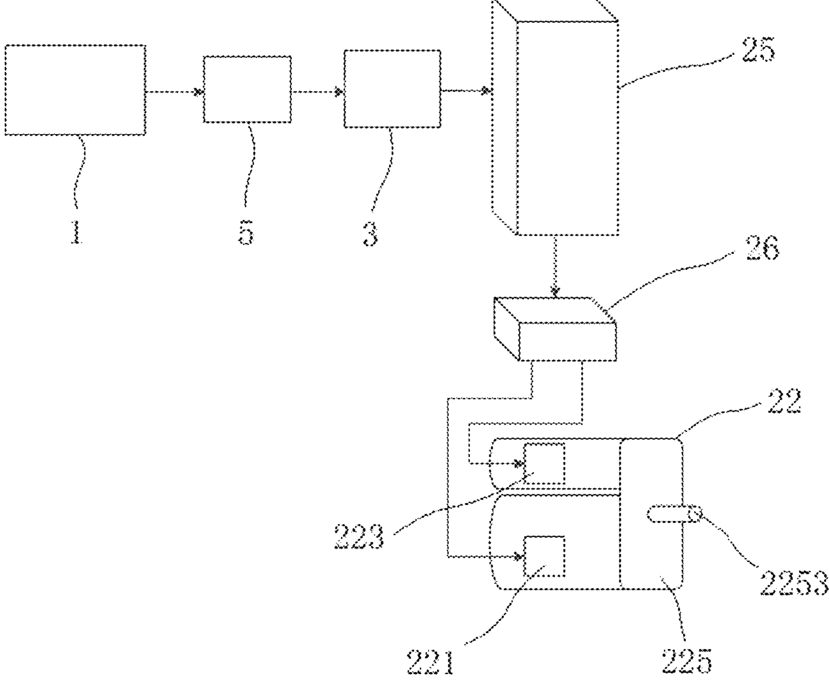
FIG. 6 is a control principle diagram of a radiation inspection system in embodiments of the present disclosure.

As shown in FIG. 6, the controller 3 is configured to receive a working mode signal of the radiation imaging device 1 and generate a control command according to the working mode signal. The working mode signal indicates the radiation imaging device 1 is in the CT inspection mode or the DR inspection mode.

The frequency converter 25 is configured to be in signal connection with the controller, to receive the control command and adjust an output parameter according to the control command.

The switching device 26 is electrically connected to the frequency converter 25 and is configured to selectively electrically connect the frequency converter 25 to one of the main motor 221 and the sub-motor 223. The switching device 26 includes, for example, an electrical switch or a relay, or the like.

The frequency converter 25 may identify the main motor 221 and the sub-motor 223 of the primary-secondary motor 22, respectively, establish an optimized control model, and store parameter sets. Each parameter set includes multiple parameters. The parameters include, for example, a power, a current, voltage, a rotation speed, and a maximum frequency of the motor. The frequency converter 25 can call a parameter set matching the main motor 221 or the sub-motor 223 that is currently electrically connected thereto, according to the control command. When the main motor 221 needs to be used, the frequency converter 25 is switched by the switching device 26 to be electrically connected to the main motor 221, and the parameter set is switched to a parameter set matching the main motor 221; and when the sub-motor 223 needs to be used, the frequency converter 25 is switched to be electrically connected to the sub-motor 223, and the parameter set is switched to a parameter set matching the sub-motor 223. Providing the frequency converter 25 and the switching device 26 is conducive to ensuring that a drive system always meets project needs with a suitable power output. Moreover, the use of one frequency converter and one set of switching device for controlling operation of the primary-secondary motor 22 is conducive to reducing a cabinet volume and saving costs.

The mode detecting device 5 is in signal connection with the radiation imaging device 1 and the controller 3, and the mode detecting device 5 is configured to monitor working parameters of the radiation imaging device 1 and transmit the working parameters as a working mode signal to the controller 3. The mode detecting device 5 includes, for example, a voltage detecting device, a current detecting device, a photoelectric sensor, or the like for monitoring whether the radiation source of the imaging part of the radiation imaging device 1 is activated.

In embodiments not illustrated, the mode detecting device 5 is not indispensable. For example, the controller 3 may identify the inspection mode of the radiation imaging device by directly receiving a control command that controls the activation of the imaging part.

Figure 5:
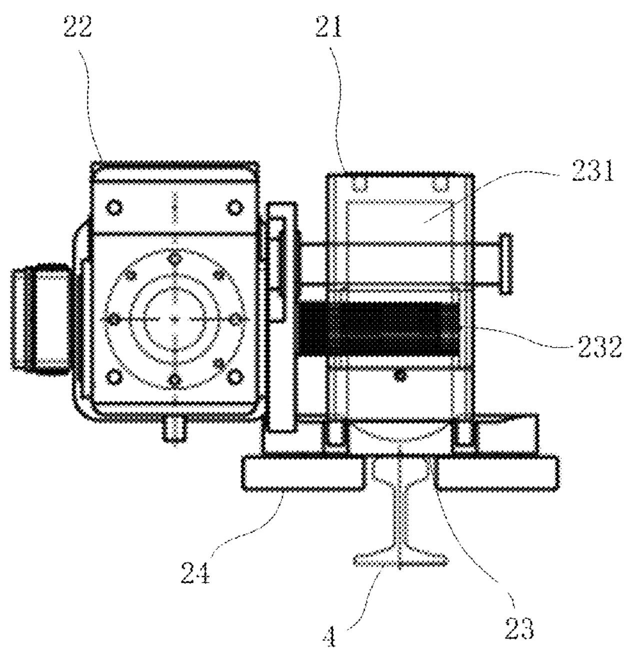
FIG. 5 is a connecting structure diagram of a primary-secondary motor and a conveying device main body in embodiments of the present disclosure.

As shown in FIGS. 1 and 5, in the present embodiments, the conveying device 2 is a self-travelling conveying device. The self-travelling conveying device includes a driving wheel 23 connected to the conveying device main body 21, and the primary-secondary motor 22 is in drive connection with the driving wheel 23. As shown in FIGS. 1 and 5, the conveying device main body 21 includes a portal frame structure. The portal frame structure includes a cross beam and two vertical beams connected to two ends of the cross beam. Driving wheels 23 are respectively provided at the bottoms of the two vertical beams to carry the portal frame structure and cause the portal frame structure to travel.

When the vehicle to be inspected is conveyed, the primary-secondary motor 22 is in drive connection with the driving wheel 23 to cause the portal frame structure to travel. The vehicle to be inspected is located within the space enclosed by the portal frame structure and the ground and is connected to the portal frame structure, and travels synchronously with the portal frame structure in the inspection channel P.

The number of the primary-secondary motor 22 may be configured according to an output power of the primary-secondary motor 22 and a driving force required for the conveying device 2. For example, in the present embodiments, three primary-secondary motors 22 are configured corresponding to each vertical beam, and each primary-secondary motor 22 is correspondingly in drive connection with one driving wheel 23.

As shown in FIGS. 1 and 5, the radiation inspection system further includes a track 4, and the driving wheel 23 is located on the track 4. The conveying device 2 further includes a limiting wheel 24. The limiting wheel 24 cooperates with a lateral side of the track 4.

As shown in FIG. 6, a housing of the primary-secondary motor 22 is fixedly connected to the conveying device main body 21, and a connecting shaft 232 of the driving wheel 23 is rotatably connected to the conveying device main body 21 and connected to the rotating shaft of the master motor 221 of the primary-secondary motor 22. A wheel body 231 of the driving wheel 23 is provided on the connecting shaft 232 and is located on an upper surface of the track 4. Limiting wheels 24 are respectively provided on two sides below a lower edge of the driving wheel 23, and a spacing is formed between the limiting wheels 24 on the two sides, and at least a portion of the track 4 is located in the spacing. In this way, the limiting wheels 24 can prevent the driving wheel 23 from disengaging from the track 4.

In embodiments of the present disclosure, the primary-secondary motor 22 drives the driving wheel 23, to drive the conveying device 2 to travel along the inspection channel P. The primary-secondary motor 22 and the driving wheel 23 may be designed as a modular traveling unit to achieve drive connection with the conveying device main body 21 that transports the vehicle to be inspected. The conveying device 2 is configured with a suitable number of traveling units and its carrying capacity can meet the needs of vehicles to be inspected of different weights.

In the radiation inspection system of embodiments of the present disclosure, the conveying device has a simple and reliable structure, is flexible and convenient to control, has a low maintenance cost, and can convey vehicles to be inspected of different weights to accomplish scanning inspection in the DR inspection mode and scanning inspection in the CT inspection mode.

Finally, it should be noted that the above embodiments are only used for describing rather than limiting the embodiments of the present disclosure. Although the present disclosure is described in detail with reference to the embodiments, modifications to the specific implementations in the present disclosure or make equivalent substitutions to part of features thereof can be made; and such modifications and equivalent substitutions should be encompassed within the solutions sought for protection in the present disclosure.

The invention claimed is:

1. A radiation inspection system, comprising:

a radiation imaging device, which comprises at least one radiation source and at least one detector module, has a CT inspection mode and a DR inspection mode, and is configured to perform radiation inspection on an object to be inspected passing through an inspection channel;

a conveying device, which comprises a conveying device main body, and a primary-secondary motor in drive connection with the conveying device main body to drive the conveying device main body to move along the inspection channel, the primary-secondary motor including a main motor, a sub-motor, and a speed reducer; and a controller in signal connection with the radiation imaging device and the primary-secondary motor, the controller being configured such that when the radiation imaging device is in the CT inspection mode, the conveying device main body is in drive connection with the sub-motor through the speed reducer to convey the object to be inspected under the drive of the sub-motor, and in the DR inspection mode, the conveying device main body is in drive connection with the main motor to convey the object to be inspected under the drive of the main motor, wherein a conveying speed when the conveying device main body is in drive connection with the main motor is higher than a conveying speed when the conveying device main body is in drive connection with the sub-motor;

wherein the primary-secondary motor further comprises a first connecting part and a second connecting part, wherein the first connecting part and the second connecting part each comprises two transmission parts having an axially connected state and an axially separated state, respectively; the speed reducer has an input shaft and an output shaft; the main motor is connected to the output shaft via the first connecting part; the sub-motor is connected to the input shaft via the second connecting part; and the primary-secondary motor is in drive connection with the conveying device main body by means of the main motor.

2. The radiation inspection system according to claim 1, wherein the controller is configured to receive a working mode signal of the radiation imaging device and generate a control command according to the working mode signal, the working mode signal indicating the radiation imaging device is in the CT inspection mode or the DR inspection mode; and the conveying device further comprises a frequency converter and a switching device, wherein the frequency converter is configured to be in signal connection with the controller, to receive the control command and adjust an output parameter according to the control command, and the switching device is electrically connected to the frequency converter and is configured to selectively electrically connect the frequency converter to one of the main motor and the sub-motor.

3. The radiation inspection system according to claim 1, further comprising a mode detecting device, wherein the mode detecting device is in signal connection with the radiation imaging device and the controller, and the mode detecting device is configured to monitor working parameters of the radiation imaging device and transmit the working parameters as a working mode signal to the controller.

4. The radiation inspection system according to claim 1, wherein the radiation imaging device comprises:

a CT imaging part, which comprises a first radiation source and a first detector module disposed corresponding to the first radiation source; and a DR imaging part, which comprises a second radiation source and a second detector module disposed corresponding to the second radiation source.

5. The radiation inspection system according to claim 1, wherein the radiation imaging device comprises one radiation source and one detector module corresponding to the radiation source, and the radiation source and the detector module switch between the DR inspection mode and the CT inspection mode.

6. The radiation inspection system according to claim 1, wherein the conveying device comprises a self-travelling conveying device, wherein the self-travelling conveying device comprises a driving wheel connected to the conveying device main body, and the primary-secondary motor is in drive connection with the driving wheel.

7. The radiation inspection system according claim 6, further comprising a track, and the driving wheel is located on the track; and the conveying device further comprises a limiting wheel, the limiting wheel cooperates with a lateral side of the track.

* * * * *